United States Patent

Matsumiya et al.

[11] Patent Number: 6,014,816
[45] Date of Patent: Jan. 18, 2000

[54] COORDINATE MEASURING APPARATUS WITH A BALL PROBE

[75] Inventors: Sadayuki Matsumiya; Shigeo Miyamoto, both of Kanagawa, Japan

[73] Assignee: Mitutoyo Corporation, Kanagawa, Japan

[21] Appl. No.: 08/910,708

[22] Filed: Aug. 13, 1997

[30] Foreign Application Priority Data

Aug. 19, 1996 [JP] Japan .................................. 8-235940

[51] Int. Cl.⁷ .................................................. G01B 5/016
[52] U.S. Cl. .................................. 33/503; 33/556; 33/559
[58] Field of Search .............................. 33/503, 556, 558, 33/559, 561

[56] References Cited

U.S. PATENT DOCUMENTS

| | | | |
|---|---|---|---|
| 1,206,668 | 11/1916 | Caron | 33/556 |
| 4,138,823 | 2/1979 | McMurtry | 33/559 |
| 4,574,199 | 3/1986 | Pryor | 33/503 |
| 5,040,306 | 8/1991 | McMurtry et al. | 33/556 |
| 5,191,717 | 3/1993 | Fujitani | 33/503 |
| 5,402,582 | 4/1995 | Raab | 33/503 |
| 5,408,754 | 4/1995 | Raab | 33/503 |
| 5,412,880 | 5/1995 | Raab | 33/503 |

*Primary Examiner*—Christopher W. Fulton
*Attorney, Agent, or Firm*—Webb Ziesenheim Logsdon Orkin & Hanson, P.C.

[57] ABSTRACT

The present inventions relates to a coordinate measuring apparatus for measuring an object to be measured by bringing it into contact with the object to be measured, comprising an arm movable in X, Y and Z axial directions orthogonally crossing each other and a ball probe attached to the extremity of the arm to output a touch signal when it comes into contact with the object to be measured, wherein the ball probe comprises a shaft supported with the arm and a ball attached to the extremity of this shaft to be brought into contact with the object to be measured, wherein a mark is defined on the surface of the ball for identifying a crossing line between a plane passing the center of the ball and orthogonally crossing the central axis of the shaft and the surface of the ball.

8 Claims, 6 Drawing Sheets

COORDINATE MEASURING APPARATUS WITH A BALL PROBE

BACKGROUND OF THE INVENTION

1. Field of the Invention

The present inventions relates to a coordinate measuring apparatus using a ball probe such as manual operation type three-dimensional measuring apparatus, a CNC three-dimensional measuring apparatus having a manual teaching function, a digitizer and so on. More particularly, this invention relates to a ball probe and a measuring apparatus using the ball probe to be used advantageously for measuring objects to be measured of particularly thin plate form, protruded portions of an object to be measured or the like.

2. Prior Art

In a manual operated three-dimensional measuring apparatus using a ball probe having a ball for being brought into contact with an object to be measured on the tip of a probe, for example, the contact position of the ball to the object can be determined by manually moving the ball probe in respective directions in a three-dimensional space, and by measuring the central coordinate value of the ball at the instant when the ball comes into contact with the object to be measured or during their contact, and then by performing the offset treatment of the radius of the ball to the central coordinate value of the ball. However, the direction of the offset to the measured central coordinate value of the ball should be beforehand specified or determined by geometric calculation using a plurality of measured central coordinate values of the ball. For instance, when the object to be measured is a hole, the ball shall be guided to three different points in the inside of this hole and brought into contact to measure respective central coordinate values. Then, the circle adapting calculation shall be performed to these three coordinate values to obtain the center and the radius of the circle, and the radius of the hole can be determined by adding this radius value and the ball radius value.

In case of thin objects, such as sheet metal wherein the thickness of the object to be measured is smaller than the ball radius, the operation of guiding a probe to bring the ball apex exactly into contact with the object to be measured for measuring the hole as mentioned above is difficult and requires skill. For instance, as shown in FIG. 9, a significant measurement error may occur when a probe 100 comes into contact with an object 101 to be measured such as thin sheet metal at a wrong measuring position B in place of a right measuring position A to be brought into contact.

Conventionally, to solve the problem mentioned above, a cylindrical probe 110 as shown in FIG. 10A has been used in place of a ball probe. By using this cylindrical probe 110, a correct measurement can be assured wherever any positions on the outer circumferential surface of the probe 110 comes into contact with an object 101 to be measured, provided that the central axis of the probe 110 and the object 101 to be measured intersect at right angles. However, one drawback of this measurement using this cylindrical probe 110 is that the vertical contact position of the probe 110 and the object 101 to be measured can not be determined. The cylindrical probe 110 is inappropriate for measuring, for example, objects to be measured having partially pointed portions or the like, because it can not identify the position in the vertical direction. As a consequence, for instance, objects to be measured having thin configuration and ordinary configuration in a mixed manner are extremely troublesome as the probe should be exchanged on the halfway of measurement and, moreover, a displacement error may often occur due to the probe exchange. As shown in Fig.10B, another problem is that a significant measurement error may occur if the central axis of the cylindrical probe 110 and the object 101 to be measured having thin sheet metal configuration are not orthogonal. Moreover, the manipulation of the cylindrical probe 110 is difficult because it presents an important inertia force due to its relatively heavy weight. Particularly when small objects having low rigidity such as sheet metal are to be measured, the inertia force of this bulky probe itself provokes torsion or deformation of the object to be measured, increasing its measurement error. Not only the manual operation of a coordinate measuring apparatus or a digitizer but also the teaching operation of a CNC three-dimensional measuring apparatus encounter such problems.

SUMMARY OF THE INVENTION

As the consequence, the object of the present invention is to provide a coordinate measuring apparatus for measuring precisely thin objects to be measured, protruded portions of an object to be measured and the like, by manual operation and to provide a ball probe used for the same.

Another object of the invention is to provide a coordinate measuring apparatus for measuring precisely also the position in the axial direction of the probe, in the case of measurement of thin objects to be measured, protruded portions of an object to be measured and the like, and to provide a ball probe used for the same.

Still another object of the invention is to provide a coordinate measuring apparatus permitting to easily perform such measurement operation and to provide a ball probe used for the same.

According to one aspect of the invention, a ball probe outputting a touch signal when it comes into contact with an object to be measured, comprises a shaft supported by a movable support member and a ball attached to the extremity of the shaft to be brought into contact with the object to be measured, wherein a mark is formed on the surface of the ball for identifying a crossing line between a plane passing the center of the ball and orthogonally crossing the central axis of the shaft and the surface of the ball.

According to one preferred embodiment of the invention, the mark comprises an appropriate width line formed on the crossing line.

The appropriate width line is, for example, a solid line, a broken line, a dotted line or the like.

In another preferred embodiment of the invention, the mark comprises appropriate width lines formed respectively on the both sides of the crossing line, so as to form an appropriate width belt zone on the crossing line.

In any of these embodiments, the appropriate width lines may be, for example, solid lines, broken lines, dotted lines or the like.

According to another aspect of the invention, a coordinate measuring apparatus for measuring an object to be measured by coming into contact with the object to be measured, comprises an arm movable in X, Y and Z axial directions crossing orthogonally each other and a ball probe attached to the extremity of the arm for outputting a touch signal when it comes into contact with the object to be measured, wherein the ball probe comprises a shaft supported with the arm and a ball attached to the extremity of the shaft to be brought into contact with the object to be measured, wherein a mark is formed on the surface of the ball for identifying a crossing line between a plane passing the center of the ball and orthogonally crossing the central axis of the shaft and the surface of the ball.

In one preferred embodiment of the invention, an angle adjustment mechanism is also provided between the arm and the ball probe for adjusting the angle of the ball probe to the arm.

Moreover according to another aspect of the invention, an arm type multi-joint coordinate measuring apparatus for measuring an object to be measured by contacting with the object to be measured, comprises a plurality of arms connected with rotative joints respectively and a ball probe attached to the farthest extreme arm for outputting a touch signal when it comes into contact with the object to be measured, wherein the ball probe comprises a shaft supported with the farthest extreme arm and a ball attached to the extremity of the shaft to be brought into contact with the object to be measured, wherein a mark is defined on the surface of the ball for identifying a crossing line between a plane passing the center of the ball and orthogonally crossing the central axis of the shaft and the surface of the ball.

BRIEF DESCRIPTION OF THE DRAWINGS

The invention is described further, by way of example, with reference to the accompanying drawings in which.

DETAILED DESCRIPTION OF THE PREFERRED EMBODIMENT

Referring to the accompanied drawings, a preferred embodiment of the present invention will be described below.

Figure 1:
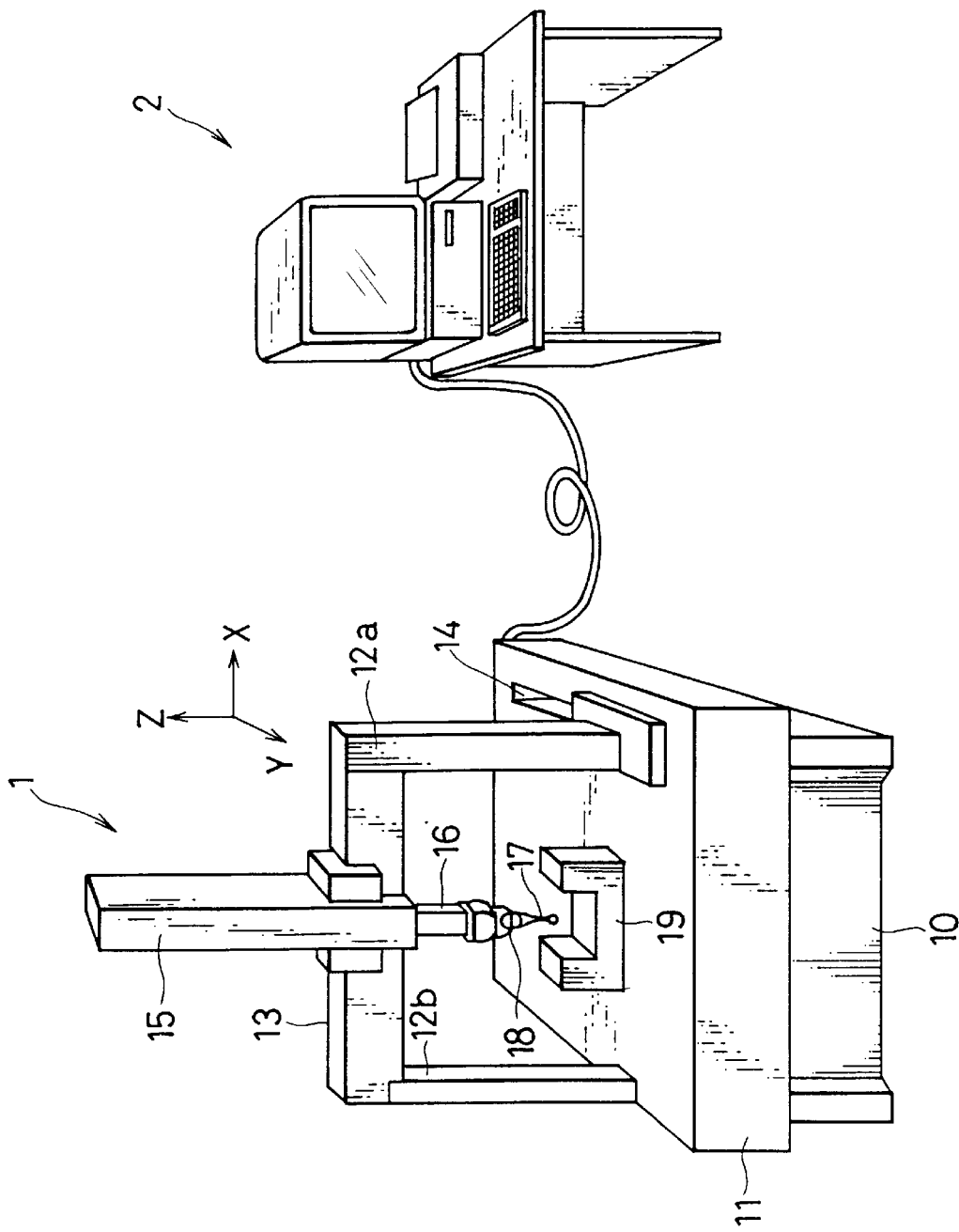
FIG. 1 is a perspective view showing the composition of a three-dimensional measuring apparatus provided with a ball probe according to the present invention.

FIG. 1 shows the composition of a manual operation type three-dimensional measuring system according to one embodiment of the present invention.

This three-dimensional measuring system comprises a three-dimensional measuring apparatus 1 and a host system 2 for processing measurement values being input from the three-dimensional measuring apparatus 1.

A measuring table 11 is mounted on a vibration isolation support 10 of the three-dimensional measuring apparatus 1 so that the top surface thereof as a base surface consists with the horizontal plane. An X axis guide 13 is supported with the extremities of arm supports 12a, 12b respectively erected from both edge sides of the measuring table 11.

The lower ends of the arm supports 12a, 12b are supported on the measuring table 11 movably in the Y axis direction by air bearings. The X axis guide 13 guides a vertically extending Z axis guide 15 in the X axis direction. A Z axis arm 16 is provided on the Z axis guide 15 such that it can move along the Z axis guide 15. A contact type ball probe 17 is fitted to the lower end of the Z axis arm 16 through a probe head 18 provided with an angle adjustment mechanism. When this ball probe 17 comes into contact with a work 19 as an object to be measured mounted on the measuring table 11, a touch signal is output from the ball probe 17 to the host system 2 and the X, Y, Z coordinate value at that moment will be input to the host system 2.

Figure 2:
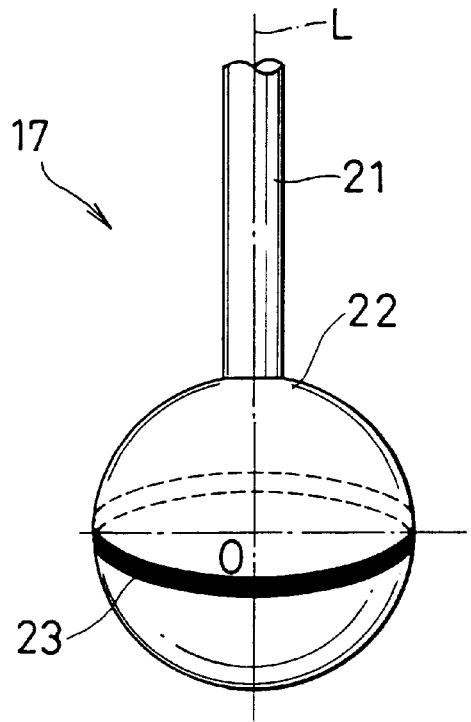
FIG. 2 shows a preferred embodiment of the ball probe of FIG. 1.

FIG. 2 shows the detail of the ball probe of FIG. 1. The ball probe 17 comprises a shaft 21 held by a probe head and a ball 22 attached to the end of the shaft 21 to touch the work 19. A mark 23 is defined on the surface of the ball 22 in order to identify a crossing line between a plane passing the center O of the ball 22 and orthogonally crossing the central axis L of the shaft 21 and the surface of the ball 22. The mark 23 is, in this example, an appropriate width solid line defined on the crossing line. The mark 23 is defined, for example, by acrylic base paints, metal vapor deposition, plating, seal application or the like. Otherwise, the mark 23 can be defined by fitting a member which color is different from that of the ball 22 into the place to be defined. However, an excessively thick member should be avoided for fear of inducing measuring error. Such member should also be good in anti-wear because it comes often into contact with the object to be measured.

Figure 3:
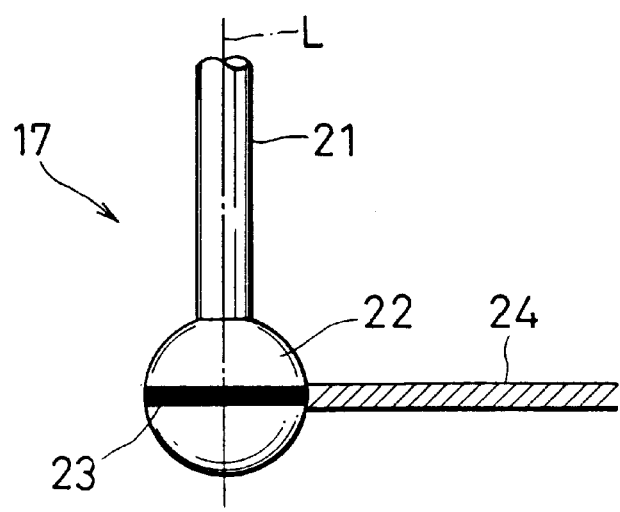
FIG. 3 illustrates the measurement of a sheet metal by the ball probe of FIG. 2.

The measuring method of a thin work such as sheet metal by means of the ball probe 17 will be described below. The operator can move this ball probe 17 in the X, Y or Z direction of FIG. 1 by hand or a speed variable motor (not shown) in cooperation with a joystick as he/she desires. When the ball 22 thus comes into contact with a target point of the object to be measured mounted on the measuring table 11 of the three-dimensional measuring apparatus 1, the central coordinate value of the ball 22 at the moment of the contact will be captured by the host system 2. FIG. 3 illustrates such contact situation of the ball 22 with a sheet metal 24 as a work. As mentioned hereinbefore, the operator moves the ball probe 17 to the target measuring point of the sheet metal 24 by his/her hand or by operating a joystick. Next, the mark 23 is brought into contact with the end of the sheet metal 24 by adjusting the position of the ball probe 17 so that the central axis L of the shaft 21 and the plane of the sheet metal 24 may be approximately perpendicular. In this adjustment, the shaft 21 can easily be put perpendicular to the face of the sheet metal 24 by adjusting so that the center lines of the mark 23 and the sheet metal 24 are align on a straight line when they are viewed just laterally. As mentioned above, the relative angle between the ball probe 17 and the sheet metal 24 can be adjusted by means of the angle adjustment mechanism of the probe head 18 provided at the extremity of the Z axis arm 16 of the three-dimensional measuring apparatus.

Figure 4:
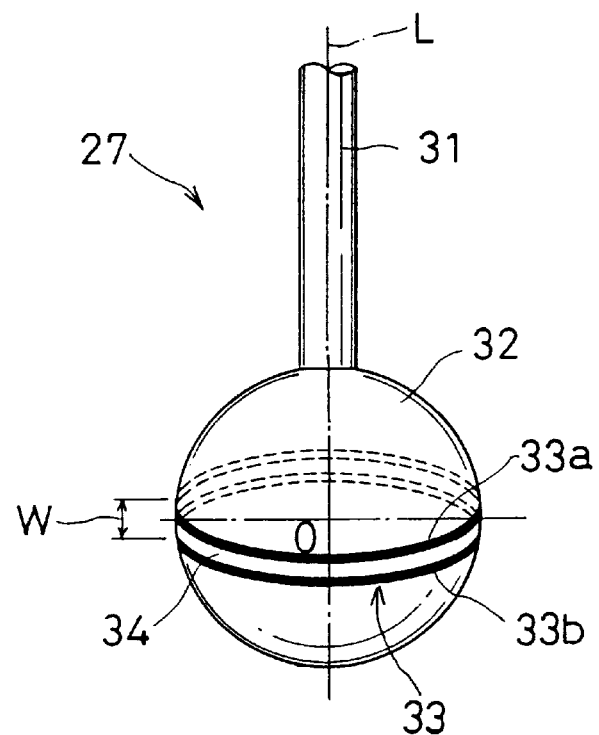
FIG. 4 shows another embodiment of the ball probe of FIG. 1.

FIG. 4 shows another ball probe 27 according to the invention. As well as the case for the ball probe 17, this ball probe 27 is provided with a shaft 31 held by the probe head 18 and a ball 32 attached to the end of the shaft 31 to touch the work 19. A mark 33 comprises solid lines 33a, 33b defined on the surface of the ball 32 for identifying a crossing line between a plane passing the center O of the ball 32 and orthogonally crossing the central axis L of the shaft 31 and the surface of the ball 32. These solid lines 33a, 33b are defined with appropriate widths respectively on the both sides of the crossing line so as to form an appropriate width belt zone 34 on the crossing line. The mark 33 can be defined, for example, by acrylic base paints, metal vapor deposition, plating, seal application or the like. Otherwise, the mark 33 may be defined by fitting members whose color are different from that of the ball 32 into the place to be defined. The guidance of the probe can be facilitated if the width W of the belt zone 34 is approximately equal to the thickness of the sheet metal to be measured. Since, it will be sufficient to guide the probe so as to meet the upper or lower face of the sheet metal with the inner edge of the solid lines 33a or 33b.

Figure 5:
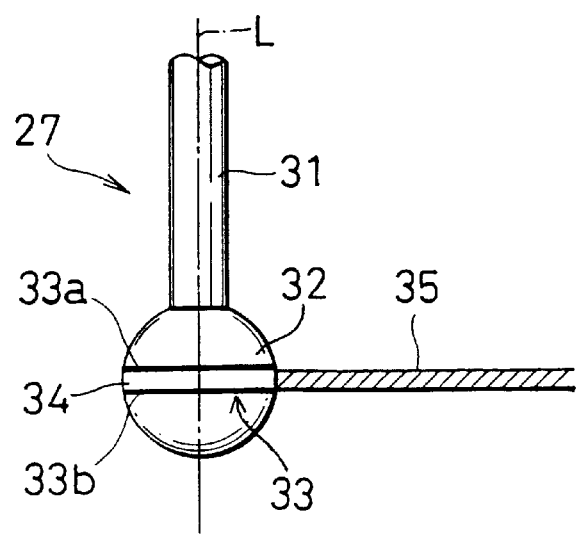
FIG. 5 illustrates the measurement of a sheet metal by the ball probe of FIG. 4.

The measuring method of a thin work such as sheet metal by means of the ball probe 27 will be described below. FIG. 5 illustrates such contact situation of the ball probe 27 with a sheet metal 35 as the work. The operation is similar to that of the ball probe 17 except that the sheet metal 35 comes into contact with the belt zone 34 free from mark between the solid lines 33a and 33b. In other words, the operator can easily guide the ball probe 27 using the solid lines 33a and 33b as guide so as to bring the belt zone 34 put between them into contact with the sheet metal 35. According to this probe 27, as the belt zone 34 is free from mark, coming off of the marked paint by rubbing with the object to be measured or measurement error due to the thickness of paint or the like can advantageously prevented.

The present invention has been described in detail hereinbefore referring to the preferred embodiments which are not intended as limiting the present invention, and a number of modifications can be made without departing from the scope of the present invention.

Figure 6:
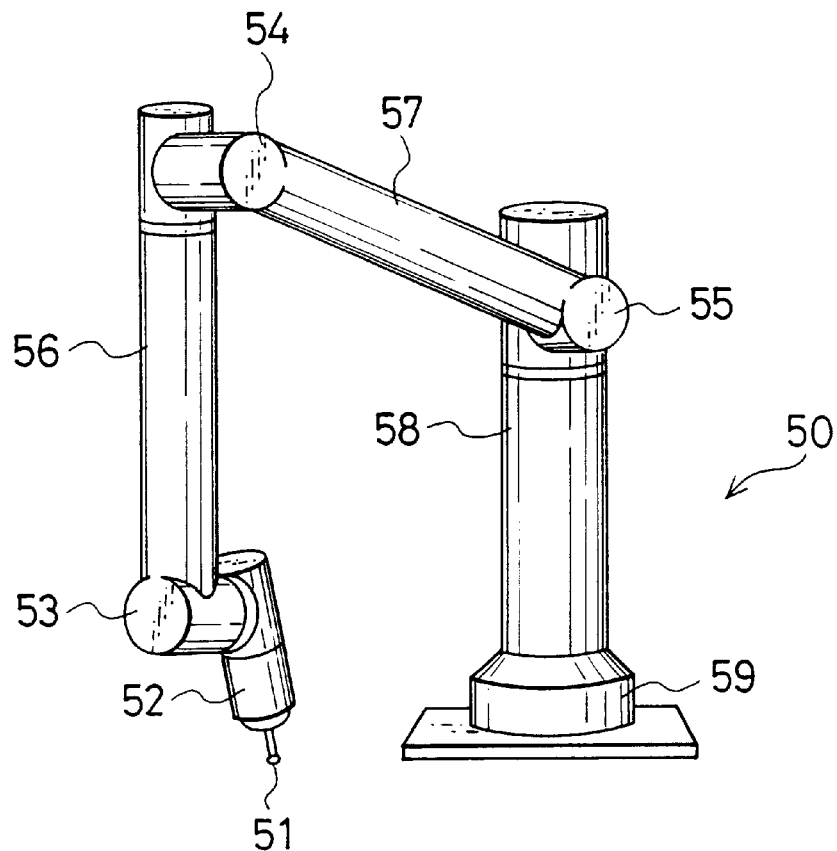
FIG. 6 is a perspective view showing an arm type multi-joint measuring apparatus provided with a ball probe according to the present invention.
Figure 9:
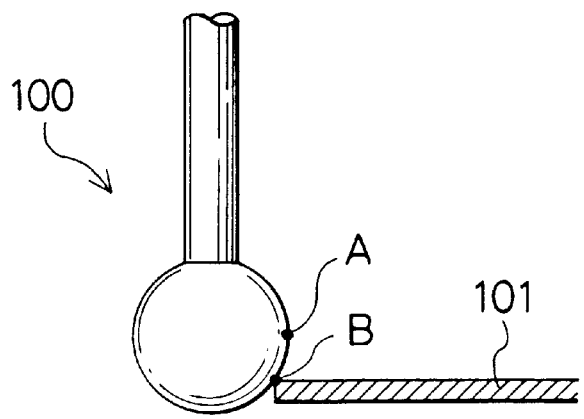
FIG. 9 shows a drawback of sheet metal measurement by a conventional ball probe.

For instance, in the above-mentioned embodiments, it has been described applying a three-dimensional measuring apparatus provided with a ball probe as an example; however, the present invention can also be applied to an arm type multi-joint coordinate measuring apparatus 50 having a plurality of joints, that is so called three-dimensional digitizer as shown in FIG. 6. Such arm type multi-joint coordinate measuring apparatus 50 comprises a support 58 erected vertically to the base 59 fixed to a worktable or the like. The support 58 and one end of a second arm 57 are connected by a third joint 55 rotatable in two axial directions and incorporating a rotary encoder (not shown) which can detect respective rotation angles. The other end of the second arm 57 and one end of a first arm 56 are connected by a second joint 54 similar to the third joint 55. The other end of the first arm 56 and a probe head 52 are coupled by a first joint 53 similar to the second joint 54. A ball probe 51 according to the invention mentioned above is provided on the extremity of the probe head 52.

Consequently, the operator can make the ball probe 51 approach to the object to be measured from any direction and bring it into contact at any angle. In the measurement of a sheet metal, for example, the operator can grasp the probe head 52, holding the attitude of the ball probe 51 vertical to the surface of the sheet metal and, guide the ball probe 51 easily so as to bring the mark put on the surface of the ball probe 51 into contact with the edge of the sheet metal. Conventionally, the measurement results of a thin work such as sheet metal by a multi-joint type coordinate measuring apparatus have been unadvantageously depend on the operators, since the attitude has been able to be changed as they like. According to the present invention, as the operator can easily bring the maximum circumferential section of the ball probe into a precise contact with an object to be measure, the measurement result dispersion in function of operator can be prevented from occurring thereof.

Figure 7A:
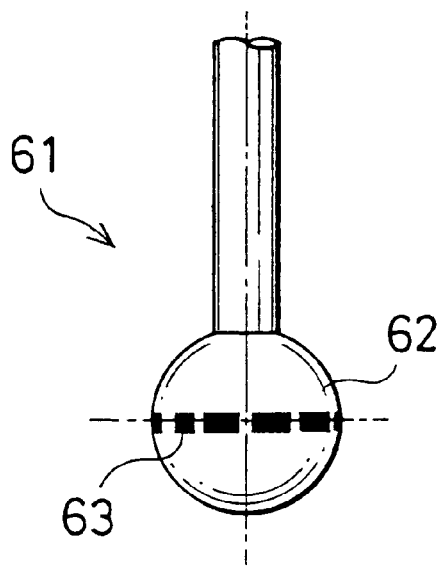
FIG. 7A and FIG. 7B show respectively another embodiment of the ball probe according to the present invention.
Figure 7B:
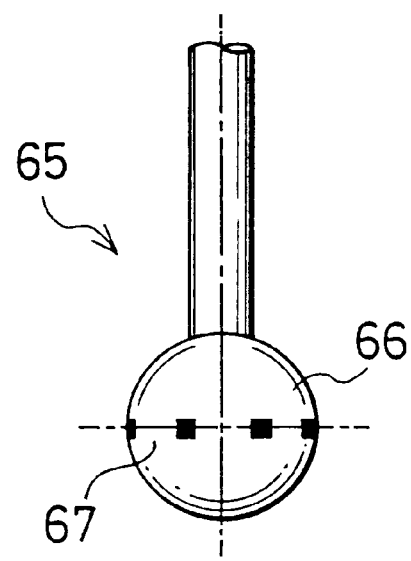
Figure 8A:
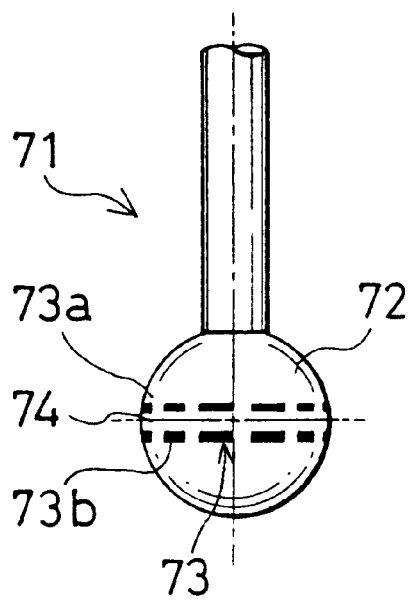
FIG. 8A and FIG. 8B show respectively still another embodiment of the ball probe according to the present invention.
Figure 8B:
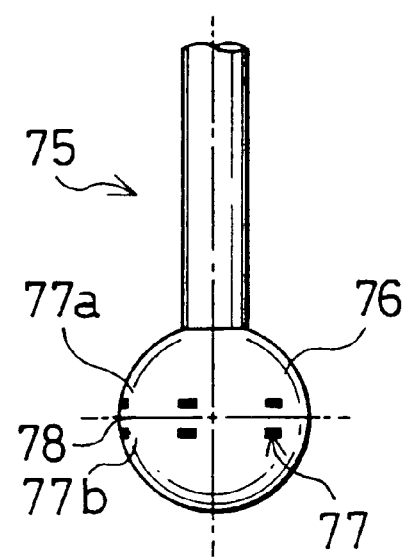
Figure 10A:
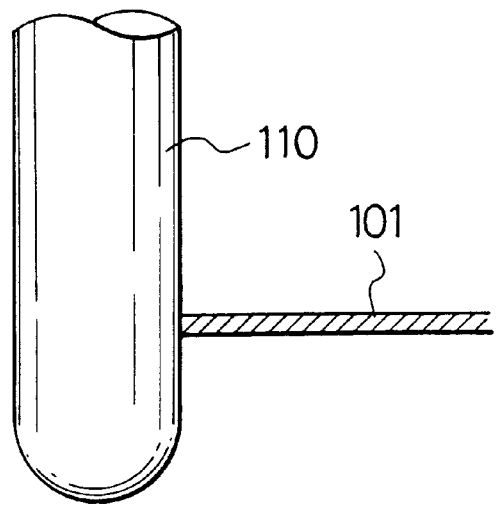
FIG. 10A and FIG. 10B show respectively the sheet metal measurement by a conventional cylindrical probe and a drawback thereof.
Figure 10B:
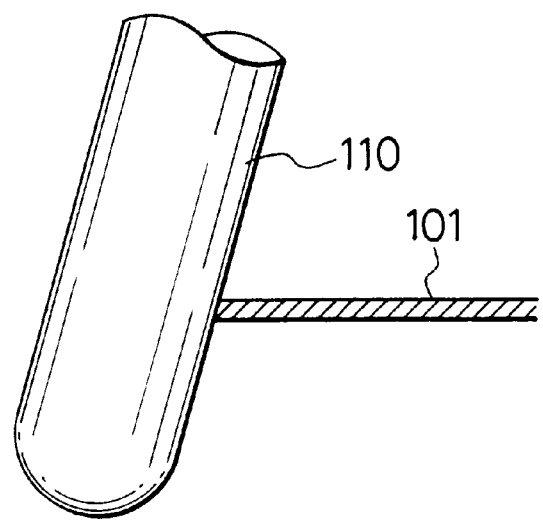

In the foregoing, the mark 23 of the ball probe 17 and the mark 33 of the ball probe 27 have been described as solid line, however, the mark for identifying the crossing line between a plane passing the center of the ball and orthogonally crossing the central axis of the shaft and the surface of the ball, namely the mark for identifying the maximum circumferential section, is not limited to the solid line. For instance, in a ball probe 61 as shown in FIG. 7A, a broken line mark 63 is defined around the maximum circumferential section of a ball 62. In a ball probe 65 as shown in FIG. 7B, a dotted line mark 67 is defined around the maximum circumferential section of a ball 65. In a ball probe 71 as shown in FIG. 8A, a mark 73 comprises broken lines 73a and 73b defined respectively on the both sides of the maximum circumferential section of a ball 72, the maximum circumferential section of the ball 72 can be identified by a belt zone 74 between broken lines 73a and 73b. In a ball probe 75 as shown in FIG. 8B, a mark 77 comprises dotted lines 77a and 77b defined respectively on the both sides of the maximum circumferential section of a ball 76, the maximum circumferential section of the ball 76 can be identified by a belt zone 78 between broken lines 77a and 77b.

As mentioned hereinbefore, according to the present invention, in the measurement of thin sheet metal, protruded section or the like by the manual operation three-dimensional measuring apparatus and digitizer, the measurement error increase can easily be prevented, by guiding the ball probe so as to bring the mark affixed to the maximum circumferential section of the ball crossing orthogonally the shaft into contact with the object to be measured.

The entire disclosure of Japanese Patent Application No. 8-235940 filed on Aug. 19, 1996 including specification, claims, drawings and summary are incorporated herein by reference in its entirety.

What is claimed is:

1. A ball probe outputting a touch signal at the moment of coming into contact with an object to be measured, comprising:

a shaft supported with a movable support member, and a ball attached to the extremity of said shaft to be brought into contact with said object to be measured, wherein a mark is positioned on the surface of said ball in order to identify a crossing line between a plane passing the center of said ball and orthogonally crossing the central axis of said shaft and the surface of said ball.

2. The ball probe of claim 1, wherein said mark comprises an appropriate width line defined on said crossing line.

3. The ball probe of claim 2, wherein said appropriate width line is a broken line or a dotted line.

4. The ball probe of claim 1, wherein said mark comprises appropriate width lines defined respectively on the both sides of said crossing line, so as to define an appropriate width belt zone on said crossing line.

5. The ball probe of claim 4, wherein said appropriate width lines are broken lines or dotted lines.

6. A coordinate measuring apparatus for measuring an object to be measured by contacting with said object to be measured, comprising:

an arm movable in X, Y and Z axial directions orthogonally crossing each other, and a ball probe attached to the extremity of said arm to output a touch signal at the moment of coming into contact with said object to be measured, wherein said ball probe comprises:

a shaft supported with said arm; and a ball attached to the extremity of said shaft to be brought into contact with said object to be measured, in which a mark is positioned on the surface of said ball in order to identify a crossing line between a plane passing the center of said ball and orthogonally crossing the central axis of said shaft and the surface of said ball.

7. The coordinate measuring apparatus of claim 6, wherein an angle adjustment mechanism is also provided between said arm and said ball probe in order to adjust the angle of said ball probe to said arm.

8. An arm type multi-joint coordinate measuring apparatus for measuring an object to be measured by contacting with said object to be measured, comprising:

a plurality of arms connected with rotative joints respectively, and a ball probe attached to the farthest extremity arm to output a touch signal at the moment of coming into contact with said object to be measured, wherein said ball probe comprises:

a shaft supported by said farthest extremity arm, and a ball attached to the extremity of said shaft to be brought into contact with said object to be measured, in which a mark is positioned on the surface of said ball in order to identify a crossing line between a plane passing the center of said ball and orthogonally crossing the central axis of said shaft and the surface of said ball.

\* \* \* \* \*